(12) United States Patent
Lee

(10) Patent No.: US 6,876,387 B1
(45) Date of Patent: Apr. 5, 2005

(54) DIGITAL ZOOM-OUT PROCESSING APPARATUS

(75) Inventor: Ho-seong Lee, Suwon (KR)

(73) Assignee: Samsung Electronics Co., Ltd., KyungKi-do (KR)

(*) Notice: Subject to any disclaimer, the term of this patent is extended or adjusted under 35 U.S.C. 154(b) by 0 days.

(21) Appl. No.: 09/472,958

(22) Filed: Dec. 27, 1999

(30) Foreign Application Priority Data

Jan. 19, 1999 (KR) .......................................... 1999-1461

(51) Int. Cl.[7] .............................................. H04N 5/262
(52) U.S. Cl. .............. 348/240.2; 348/239; 348/231.99; 348/208.6
(58) Field of Search ........................ 348/207.1, 208.99, 348/208.1, 208.6, 208.5, 240.99, 240.1, 240.2, 239, 369, 348, 36, 39, 240

(56) References Cited

U.S. PATENT DOCUMENTS

| 5,412,421 A | * | 5/1995 | Hale et al. ............. 348/208.14 |
| 5,510,830 A | | 4/1996 | Ohia et al. .................... 348/36 |
| 5,666,160 A | * | 9/1997 | Hwang ..................... 348/240.2 |
| 6,157,747 A | * | 12/2000 | Szeliski et al. ............. 382/284 |

FOREIGN PATENT DOCUMENTS

| WO | 94/10653 | 5/1994 | ............ G06K/9/36 |
| WO | 98/15130 | 4/1998 | .......... H04N/13/02 |

* cited by examiner

Primary Examiner—Tuan Ho
(74) Attorney, Agent, or Firm—Sughrue Mion, PLLC

(57) ABSTRACT

A digital zoom-out processing apparatus for accomplishing a digital zoom-out function by synthesizing a plurality of field or frame image information using motion information, is provided. The apparatus includes an image signal storage unit, a motion information detector, and a record and control unit. The image signal storage unit stores a plurality of frames or field image signals. The motion information detector detects the motion information between two image signals. The record and control unit zooms out received frame or field image signals in accordance with the given magnification and recording zoomed-out image signals in the image signal storage unit, and controls the location in the image signal storage at which the zoomed-out image signals are to be recorded. The digital zoom-out apparatus accomplishes a digital zoom-out function which enables processing of a large image in units of one screen.

15 Claims, 7 Drawing Sheets

US 6,876,387 B1

DIGITAL ZOOM-OUT PROCESSING APPARATUS

BACKGROUND OF THE INVENTION

1. Field of the Invention

The present invention relates to a digital zoom-out processing apparatus, and more particularly, to an apparatus for performing digital zoom-out by synthesizing a plurality of field or frame image information using motion information.

2. Description of the Related Art

Conventional digital cameras have a digital zoom function which provides a zooming effect by digitally processing a given input image signal independent of an optical lens. Digital zoom processing includes magnification of an input image and reduction thereof. FIGS. 1A–1C illustrate a digital zoom function, in which FIG. 1A is a received original image, FIG. 1B is a magnification of portion of the received image, and FIG. 1C is a reduction of the received image. In the present invention, for convenience of explanation, magnification of a received image signal will be referred to as digital zoom-in, and reduction of the received image signal will be referred to as digital zoom-out.

As shown in FIGS. 1A and 1B, the result of the digital zoom-in can be obtained entirely from the received image. However, the result of the digital zoom-out is smaller than the received original image, as illustrated by FIG. 1C in comparison to FIG. 1A, so that an area on a display screen other than the digitally zoomed-out image must be processed as blank or require a different process.

Therefore, conventional digital cameras have a digital zoom-in function but do not have a digital zoom-out function.

SUMMARY OF THE INVENTION

To solve the above-problems, an objective of the present invention is to provide a digital image processing apparatus having a digital zoom-out function.

Accordingly, to achieve the above objective, the present invention provides a digital zoom-out apparatus for zooming out a received image signal in accordance with a given magnification, the apparatus comprising: an image signal storage unit for storing a plurality of frames or field image signals; a motion information detector for detecting the motion information between two image signals; and a record and control unit for zooming out received frame or field image signals in accordance with the given magnification, for recording zoomed-out image signals in the image signal storage unit, and for controlling the location in the image signal storage at which the zoomed-out image signals are to be recorded.

The digital zoom-out apparatus can obtain a digital zoomed-out image by zooming out a plurality of received frame or field images and synthesizing zoomed-out images according to the degree of overlapping between the zoomed-out images.

BRIEF DESCRIPTION OF THE DRAWINGS

The above objective and advantage of the present invention will become more apparent by describing in detail a preferred embodiment thereof with reference to the accompanying drawings, in which.

DETAILED DESCRIPTION OF THE PREFERRED EMBODIMENT

A digital image processing apparatus according to the present invention accomplishes a digital zoom-out function by synthesizing a plurality of field or frame images using hand jittering correction information.

Figure 1A:
FIGS. 1A–1C show pictures for illustrating a digital zoom function.
Figure 1B:
Figure 1C:
Figure 2:
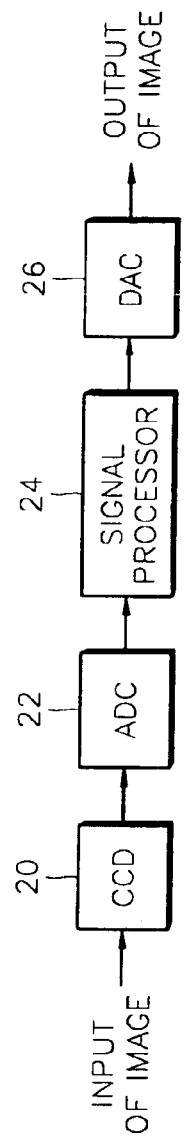
FIG. 2 is a block diagram illustrating the general function of a digital camera.

In a digital camera shown in FIG. 2, a charge coupled device (CCD) 20 converts an optical signal received of an object to an electrical signal, and an analog-to-digital converter (ADC) 22 converts the electrical signal received from the CCD 20 into a digital signal. A signal processor 24 processes the digital electrical signal provided by the ADC 22 to generate a digital image signal. The digital image signal output from the signal processor 24 is converted into an analog image signal by a digital-to-analog converter (DAC) 26, and the analog image signal is output to a view finder (not shown) or a liquid crystal display (not shown).

Figure 3:
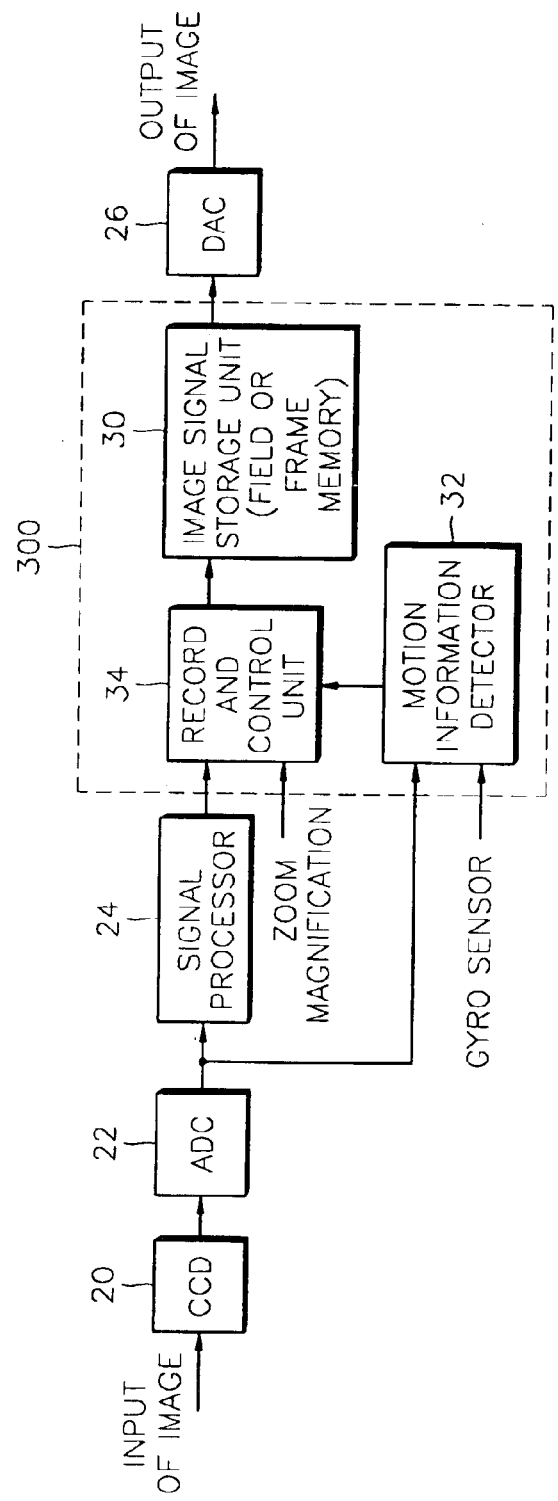
FIG. 3 is a block diagram illustrating the configuration of a digital camera adopting a digital zoom-out processing apparatus according to the present invention.

FIG. 3 is a block diagram illustrating the configuration of a digital camera adopting a digital zoom-out processing apparatus according to the present invention. In FIG. 3, the same reference numerals are assigned to members for performing the same operations as those shown in FIG. 2, and the same members as those in FIG. 2 will not be described again.

The digital camera shown in FIG. 3 further includes a digital zoom-out processing unit 300 in addition to the elements shown in FIG. 2. The digital zoom-out processor 300 includes an image signal storage unit 30, a motion information extraction unit 32, and a record and control unit 34.

The image signal storage unit 30 stores a plurality of field or frame image signals. Typically, the image signal is of the non-interlaced scanning type consisting of frames. However, an interlaced scanning type may be used, dividing a frame into two fields. For convenience of explanation, the present invention describes processing of frame image signals as an example. Processing of field image signals of the interlaced scanning type is the same as processing of frame image signals except for the difference in the amount of information that is processed.

The storage position (the location in memory) of a frame image signal in the image signal storage unit 30 is determined by the record and control unit 34. The record and control unit 34 zooms out a received frame image signal according to a zoom-out magnification, and controls the location in the image signal storage unit 30 at which a received frame image signal is stored, with reference to motion information provided by the motion information detector 32.

The motion information detector 32 detects motion information by comparing a previously-received frame image signal with a currently-received frame image signal, or by using a device such as an accelerometer or a gyroscopic sensor. The detected motion information is provided to the record and control unit 34.

The operation of the apparatus shown in FIG. 3 is similar to a jigsaw puzzle. When a digital camera user photographs a scene several times to have several different pictures having overlapping portions, the digital camera zooms out received images, determines the degree of duplication between the received images, and arranges zoomed-out images so that the zoomed-out images are matched with each other.

Figure 4A:
FIGS. 4A through 4G are pictures for illustrating the operation of the apparatus shown in FIG. 3.
Figure 4B:
Figure 4C:
Figure 4D:
Figure 4E:
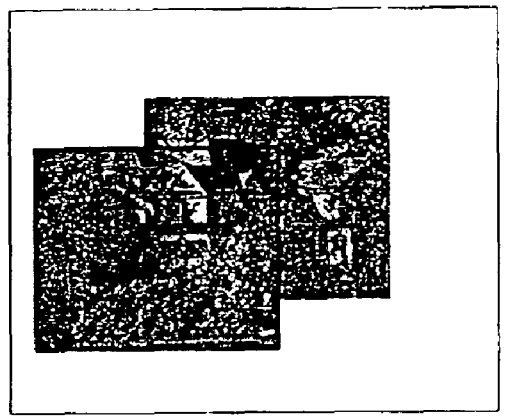
Figure 4F:
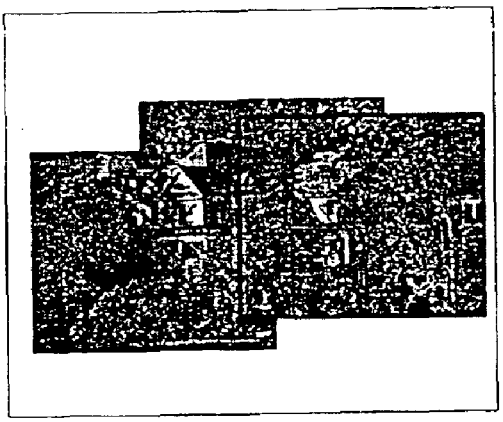
Figure 4G:
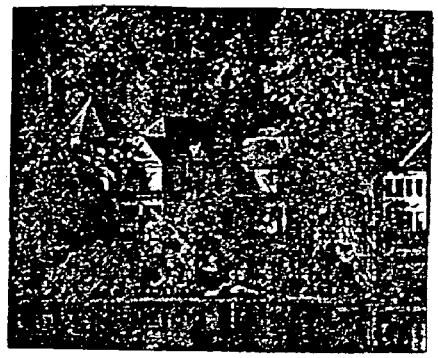

FIGS. 4A through 4G are pictures for illustrating the operation of the apparatus shown in FIG. 3. FIG. 4A is a scene intended to be photographed. FIGS. 4B through 4D are pictures in which parts of FIG. 4A are photographed. FIGS. 4E and 4F are pictures in which the pictures of FIGS. 4B through 4D are zoomed out and synthesized using the previous image signal and motion information. FIG. 4G is a final picture obtained through the processes shown in FIGS. 4E and 4F. It can be seen that FIG. 4G is a picture obtained by zooming out FIG. 4A.

Figure 5:
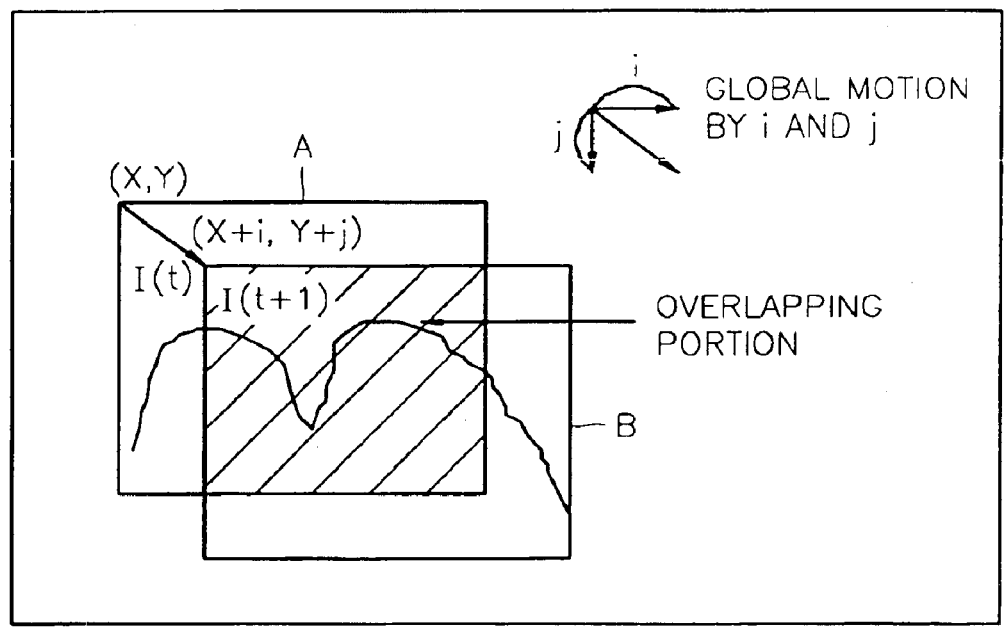
FIG. 5 is a conceptual view illustrating the operation of the motion information detector 32 shown in FIG. 3.

FIG. 5 is a conceptual view illustrating the operation of the motion detector 32 shown in FIG. 3. The motion information detector 32 detects motion information between two received frame screens. As shown in FIG. 5, motion between two screens A and B includes a horizontal motion i and a vertical motion j. The hatched portion of FIG. 5 is a portion where the two screens A and B overlap each other. Thus, when the screen A is recorded, and the screen B is then recorded at a location isolated by i and j from the screen A, a synthesized screen of the screens A and B can be obtained.

The motion information can be obtained by comparing the previous received frame image signal with a current received frame image signal, by using a device such as an accelerometer, a gyroscopic sensor, or by other methods.

The record and control unit 34 zooms out a received frame image signal according to a zoom-out magnification, and then stores the resultant signal in the image signal storage unit 30 with reference to motion information provided by the motion information detector 32. At this time, duplicate portions can maintain the previous image signal, or replace the previous image signal with a new image signal, an interpolation signal of the previous image signal and the new image signal, or the like.

Figure 6:
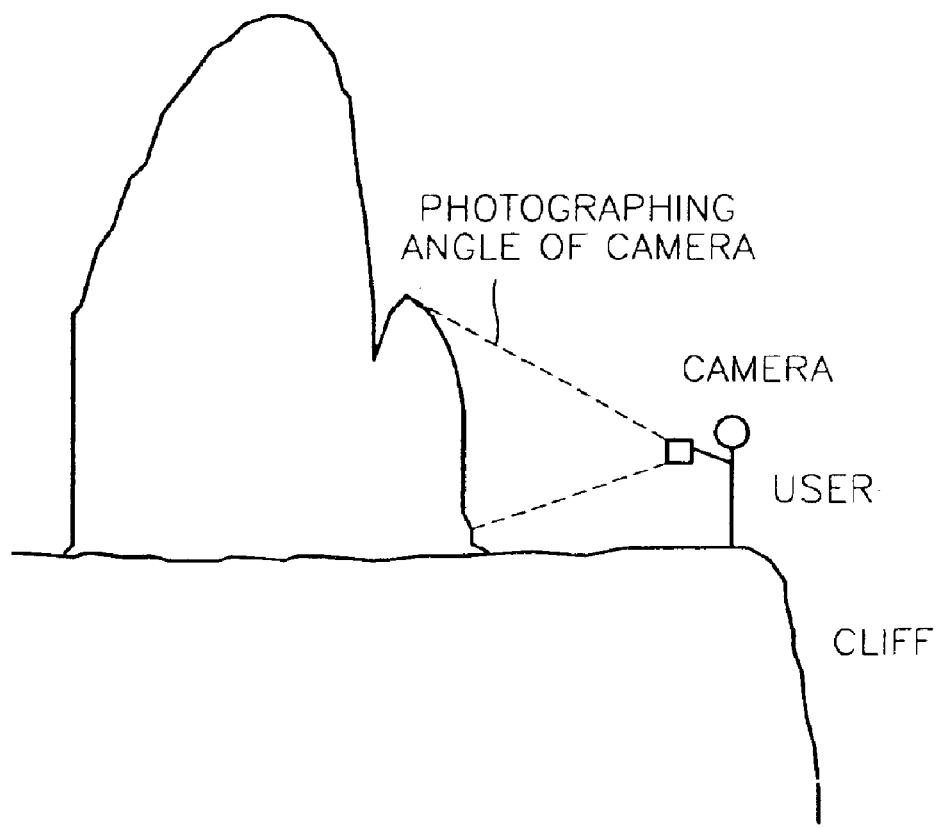
FIG. 6 shows an example in which a camera photographs an image, which is larger than the angle of view, using the apparatus shown in FIG. 3.

FIG. 6 shows an example in which a camera photographs an image, which is larger than the viewing angle, using the apparatus shown in FIG. 3. When a camera is very close to an object and the distance between them cannot be lengthened as shown in FIG. 6, the apparatus shown in FIG. 3 can be used to easily photograph an object which is larger than the viewing angle of the camera.

As described above, a digital zoom-out apparatus according to the present invention accomplishes a digital zoom-out function, thus enabling the formation and processing of a synthesized large-area image of units of one screen.

Although the digital zoom-out apparatus was described for use with a digital camera, it can also be adopted in digital video cameras that support an output of still images, to create a large-area panoramic image.

It is contemplated that numerous modifications may be made to the digital zoom-out apparatus of the present invention without departing from the spirit and scope of the invention as defined in the following claims.

What is claimed is:

1. A digital zoom-out apparatus for forming a zoomed-out image from a plurality of received image signals in accordance with a given magnification, the apparatus comprising:

an image signal storage unit which stores a plurality of frame or field image signals;

a motion information detector which detects motion information between first and second image signals of the plurality of frame or field image signals; and a record and control unit which zooms out the received frame or field image signals in accordance with the given magnification, receives motion information from said motion information detector, controls the location in said image signal storage where the zoomed-out image signals are to be recorded, and records zoomed-out image signals in said image signal storage unit, wherein the first image signal corresponds to a first image of a first area, and the second image signal corresponds to a second image of a second area, and wherein the plurality of received frame or field images, including the first and second images, are zoomed-out and combined to form the zoomed-out image, which is synthesized according to a degree of overlap between the received images, the zoomed-out image including overlapping portions of at least the first and second areas, and at least some of non-overlapping portions of the first and second areas.

2. The digital zoom-out apparatus of claim 1, wherein said motion information detector uses data provided by an accelerometer to detect the motion information.

3. The digital zoom-out apparatus of claim 1, wherein said motion information detector uses data provided by a gyroscopic sensor to detect the motion information.

4. The digital zoom-out apparatus of claim 1, wherein said motion information detector compares a previously-received image signal with a currently-received image signal to detect said motion information.

5. The digital zoom-out apparatus of claim 1, wherein said record and control unit stores in said image signal unit only those portions of received images needed to form the zoomed-out image, whereby storage space is conserved by elimination of redundant information.

6. The digital zoom-out apparatus of claim 5, wherein redundant copies of duplicate portions of received images which overlap are not stored in said image signal unit by said record and control unit.

7. The digital zoom-out apparatus of claim 6, wherein when said record and control unit receives a new image signal which includes a duplicate portion overlapping with a previously-received image signal, the record and control unit maintains the duplicate portion from the previously-received image signal.

8. The digital zoom-out apparatus of claim 6, wherein when said record and control unit receives a new image signal which includes a duplicate portion overlapping with a previously-received image signal, the record and control unit replaces the duplicate portion of the previously-received image signal with the duplicate portion of the new image signal.

9. The digital zoom-out apparatus of claim 6, wherein when said record and control unit receives a new image signal which includes a duplicate portion overlapping with a previously-received image signal, the record and control unit stores an interpolation of the duplicate portion of the previously-received image signal and the duplicate portion of the new image signal.

10. The digital zoom-out apparatus of claim 6, wherein non-overlapping portions of received images, needed to form the zoomed-out image, are stored in said image signal unit by said record and control unit.

11. The digital zoom-out apparatus of claim 1, wherein the zoomed-out image includes a larger area than that of the first image, and includes a larger area than that of the second image.

12. The digital zoom-out apparatus of claim 1, wherein the plurality of received frame or field images are images captured by a camera, and wherein the zoomed-out image includes an area larger than a respective area within a viewing angle of the camera when capturing each of the images.

13. The digital zoom apparatus of claim 1, wherein part of the zoomed-out image is created by a single image signal.

14. The digital zoom-out apparatus of claim 1, wherein in the overlapping portion of said first image and said second image, only the first image signal is stored in said image signal unit by said record and control unit.

15. The digital zoom-out apparatus of claim 1, wherein in the overlapping portion of said first image and said second image, only the second image signal is stored in said image signal unit by said record and control unit.

* * * * *